United States Patent
Kim et al.

(10) Patent No.: US 9,436,650 B2
(45) Date of Patent: Sep. 6, 2016

(54) MOBILE DEVICE, DISPLAY DEVICE AND METHOD FOR CONTROLLING THE SAME

(71) Applicant: LG ELECTRONICS INC., Seoul (KR)

(72) Inventors: Jungwoo Kim, Seoul (KR); Mingoo Kim, Seoul (KR); Kyunggeun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 669 days.

(21) Appl. No.: 13/684,403

(22) Filed: Nov. 23, 2012

(65) Prior Publication Data

US 2013/0138728 A1 May 30, 2013

Related U.S. Application Data

(60) Provisional application No. 61/563,614, filed on Nov. 25, 2011.

(51) Int. Cl.
   *G06F 15/16*   (2006.01)
   *H04L 29/08*   (2006.01)
   *H04L 12/28*   (2006.01)

(52) U.S. Cl.
   CPC ............ *G06F 15/16* (2013.01); *H04L 12/282* (2013.01); *H04L 12/2812* (2013.01); *H04L 67/16* (2013.01); *H04L 2012/2841* (2013.01); *H04L 2012/2849* (2013.01)

(58) Field of Classification Search
   CPC .... G06F 3/048; G06F 3/1423; G06F 3/0488; G06F 3/1454; G06F 21/34
   USPC ........................................................ 709/203
   See application file for complete search history.

(56) References Cited

U.S. PATENT DOCUMENTS

| | | | |
|---|---|---|---|
| 8,254,991 B1* | 8/2012 | Biere et al. .................. 455/557 |
| 2008/0165787 A1* | 7/2008 | Xu .......................... H04L 12/56 370/395.2 |
| 2010/0037057 A1* | 2/2010 | Shim et al. .................. 713/171 |
| 2011/0080894 A1* | 4/2011 | Iwamura .......... H04W 36/0022 370/331 |
| 2012/0084387 A1* | 4/2012 | Fujita .................... G06F 3/0605 709/214 |
| 2014/0092259 A1* | 4/2014 | Tsang ................... G06F 1/1632 348/207.1 |

* cited by examiner

*Primary Examiner* — Kevin Bates
*Assistant Examiner* — Sm Rahman
(74) *Attorney, Agent, or Firm* — Birch, Stewart, Kolasch & Birch, LLP

(57) ABSTRACT

A mobile device, a display device and a method for controlling the same are disclosed. The mobile device for performing data communication with a display device includes a display module configured to display a current screen including at least one object, a transmission module configured to transmit an image corresponding to the current screen to the display device if mirroring connection with the display device is established, a reception module configured to receive at least one command for controlling a specific object from the display device, and a controller configured to execute the specific object based on the received at least one command.

20 Claims, 20 Drawing Sheets

FIG. 5

| Elements | Sub elements | Description |
|---|---|---|
| Connectivity Information | Bdaddr | Bluetooth MAC address |
| | startConnection | Whether to use Bluetooth as basic channel for sending audio e.g. True or false |
| RTP Information | payloadType | supportable RTP payload type information e.g. mono (8bits, 8kHz) or stereo (16bits, 48kHz) |
| | audioIPL | minimum buffer size for playing back audio data received from RTP |
| | audioMPL | maximum buffer size for buffering audio data received from RTP |
| Icon Preference | mimetype | Kind of icon image e.g. image/png |
| | height | Image size (vertical length) |
| | width | Image size (horizontal length) |

FIG. 6

| Elements | Subelements | Description |
|---|---|---|
| Application Information | appCategory | Category of applications<br>e.g. Navigation, SMS, Email |
| | trustLevel | trust level of application<br>e.g. Unknown, user configuration, self-egistered application, registered application, application certificate |
| Display Information | contentCategory | Category of contents provided by applications<br>e.g. Text, video, image, user interface, car mode, misc. |
| | contentRules | rules defining whether contents shall be displayed<br>e.g. Minimum font size required, no video is shown, no automatic scrolling text, maximum feedback time |
| Remoting Information | protocolID | remoting protocols to be used between applications<br>e.g. VNC, RTP, BTA2DP, DAP |
| | format | content type to be transmitted through Remoting protocol.<br>e.g. RTP payload type (mono or stereo) |
| Audio Information | audioType | type of audio<br>e.g. phone call audio, application audio, all, none |
| | audioCategory | Category of audio<br>e.g. phone audio, media audio out/in, voice command out/in |
| | contentRules | rules defining whether contents shall be displayed |
| | trustLevel | trust level of application |

| Variable name | R/O | Data Type | Allowed Value | Default Value | Evented |
|---|---|---|---|---|---|
| SelectedObject | R | string | DIDL-Lite XML Document | | Yes |

FIG. 11

```
<DIDL-Lite
    xmlns:dc="http://purl.org/dc/elements/1.1/"
    xmlns="urn:schemas-upnp-org:metadata-1-0/DIDL-Lite/"
    xmlns:upnp="urn:schemas-upnp-org:metadata-1-0/upnp/"
    xmlns:xsi="http://www.w3.org/2001/XMLSchema-instance"
    xsi:schemaLocation="
        urn:schemas-upnp-org:metadata-1-0/DIDL-Lite/
        http://www.upnp.org/schemas/av/didl-lite.xsd
        urn:schemas-upnp-org:metadata-1-0/upnp/
        http://www.upnp.org/schemas/av/upnp.xsd">
    <item id="InternetStream1" restricted="0">
        <dc:title>Some Stream</dc:title>
        <upnp:class>
            object.item.videoItem
        </upnp:class>
        <res protocolInfo="rtsp-rtp-udp:*:MPV:*">
            rtsp://internet-server/stream1.m2v
        </res>
        <res protocolInfo="http-get:*:video/mpeg:*">
            http://upnp-device/stream1.m2v
        </res>
    </item>
</DIDL-Lite>
```

FIG. 13

| Variable name | R/O | Data Type | Allowed Value | Default Value | Evented |
|---|---|---|---|---|---|
| SelectedObject | R | string | DIDL-Lite XML Document | Meta-info of the selected object | Yes |
| SourceProtocol Info | R | string | A comma separated value list of information on protocols | Available transport and content format of the selected object | No |
| A_ARG_TYPE _ProtocolInfo | R | string | A comma separated value list of information on protocols | Available transport and content format of the selected object | No |
| A_ARG_TYPE _ConnectionID | R | i4 | | Identifier of a connection established for media streaming or file transfer | No |
| A_ARG_TYPE _RcsID | R | i4 | | Identifier of the client that will get media content or files | |
| CurrentObjectStatus | R | string | Playing, stopped | Status of the current object. | |

FIG. 14

| Name | R/O | Control Point R/O | Description | Arguments (Name/Direction/Description) |
|---|---|---|---|---|
| GetProtocolInfo | O | O | Request content format support of the server | ProfileID/IN/Identifier of a client profile ContentURI/IN/Identifier of an content ProtocolInfo/OUT/information of an object including content format support |
| SetProtocolInfo | R | R | Provide the server with content formats that can be used for the connection. If the ProtocolInfo is null, the client cannot process the selected object (e.g. codec used for the object is not supported on the client) | ContentURI/IN/identifier of an content ProtocolInfo/IN/information of an object including content format that will be used for the connection ProtocolInfoAgreed/OUT/ meta information that is about to use for the connection |
| Play | R | R | Play the current object | ConnectionID/IN/Identifier of a connection ContentURI/IN/Identifier of an content |
| Pause | O | O | Pause the current object | ConnectionID/IN/Identifier of a connection ContentURI/IN/Identifier of an content |
| Stop | O | O | Stop the current object | ConnectionID/IN/Identifier of a connection ContentURI/IN/Identifier of an content |
| GetMediaInfo | O | O | Request meta information of an object | ConnectionID/IN/Identifier of a connection MetaInfo/IN/meta-information of the requested object |

MOBILE DEVICE, DISPLAY DEVICE AND METHOD FOR CONTROLLING THE SAME

This application claims the benefit of U.S. 61/563,614, filed on Nov. 25, 2011, which is hereby incorporated by reference as if fully set forth herein.

BACKGROUND OF THE INVENTION

1. Field of the Invention

The present invention relates to a mobile device, a display device and a method for controlling the same and, more particularly, to a solution for sharing a screen of a mobile device with a display device mounted in a car and directly controlling the mobile device using the display device. For example, a new protocol for extending a universal plug and play (UPnP) is proposed. Further, an embodiment of the present invention is, for example, applicable to the case in which the display device mounted in the car and the mobile device are connected via a universal serial bus (USB) interface and a screen mirroring/sharing function is provided.

2. Discussion of the Related Art

Recently, as technologies have been developed, when apparatuses such as PCs/home appliances/wireless apparatuses/wired apparatuses are connected to a network, the apparatuses connected via a wired or wireless network interface may be automatically recognized. For example, if UPnP is used, when a user adds an arbitrary apparatus to a network, the added arbitrary apparatus completes a configuration thereof and uses a protocol based on the HyperText Transfer Protocol (HTTP) of the Internet in order to inform other apparatuses that the arbitrary apparatus is present. More specifically, for example, a camera and a printer are currently connected to a network, and, when a user wishes to output a photo through the printer, the user presses a button of the camera such that the camera transmits a discovery request signal to the network. Accordingly, a determination as to whether an available printer is present in the network may be made and the printer which receives the request signal transmits location information thereof to the camera in the form of a uniform resource locator (URL). In addition, data transmission between heterogeneous devices is performed in the form of a file or stream.

However, in a conventional process of transmitting a file or stream between heterogeneous devices, since the heterogeneous devices use different user interfaces or file hierarchies, it is difficult for a user who simultaneously uses the heterogeneous devices to search for desired content.

For example, a file hierarchy provided by a server (mobile device) is classified into a YouTube folder, a mellow folder and a "new songs on Oct." folder. The YouTube folder includes video1 to video103 files, the mellow folder includes video201 to video240 files and the "new songs on Oct." folder includes song101 (audio file) to song311 (audio file) files.

A file hierarchy provided by a client (display device) includes only two folders: one folder includes all video files and the other folder includes all audio files.

Accordingly, as described above, according to the related art, since the file hierarchy provided by the server (mobile device) is not sent to the client (display device) without change, it takes considerable time for a user who is familiar with the mobile device to search the display device for the same file.

SUMMARY OF THE INVENTION

Accordingly, the present invention is directed to a computing device for performing at least one function and a method for controlling the same that substantially obviate one or more problems due to limitations and disadvantages of the related art.

An object of the present is to propose a technique for equally outputting a file hierarchy or user interface provided by a server (e.g., a mobile device) on a screen of a client (e.g., a display device). In particular, a solution applicable to even the case in which the mobile device and the display device use different data processing protocols is provided.

Another object of the present invention is to provide a solution for selecting and executing arbitrary content stored in the mobile device using the display device.

Another object of the present invention is to provide a method for differently processing video content and an image other than the video content in order to providing data processing efficiency.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device for performing data communication with a mobile device includes a communication module configured to establish mirroring connection with the mobile device, an output module configured to display a current screen of the mobile device, a user interface module configured to receive a command for selecting a first location value, and a controller configured to control the communication module to transmit at least one command for controlling a specific object corresponding to the first location value to the mobile device, wherein the controller controls the output module to output at least one of video data or audio data associated with execution of the specific object.

According to another embodiment of the present invention, a method for controlling a display device for performing data communication with a mobile device includes establishing mirroring connection with the mobile device, displaying a current screen of the mobile device, receiving a command for selecting a first location value through a user interface of the display device, and transmitting a signal for requesting metadata corresponding to the first location value to the mobile device, receiving a signal including metadata of a specific object from the mobile device, and outputting at least one of video data or audio data associated with execution of the specific object.

According to another embodiment of the present invention, a mobile device for performing data communication with a display device includes a display module configured to display a current screen including at least one object, a transmission module configured to transmit an image corresponding to the current screen to the display device if mirroring connection with the display device is established, a reception module configured to receive at least one command for controlling a specific object from the display device, and a controller configured to execute the specific object based on the received at least one command.

According to another embodiment of the present invention, a method for controlling a mobile device for performing data communication with a display device includes outputting a current screen including at least one object, transmitting an image corresponding to the current screen to the display device if mirroring connection with the display device is established, transmitting a signal including metadata of a specific object to the display device, and executing the specific object.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 5 is a diagram showing a client profile according to an embodiment of the present invention;

FIG. 6 is a diagram showing an application list according to an embodiment of the present invention;

FIG. 11 is a diagram showing another example of the data hierarchy which may be used in the first embodiment for implementing the system of FIG. 9;

FIG. 13 is a diagram showing an example of a data hierarchy which may be used in a second embodiment for implementing the system of FIG. 9;

FIG. 14 is a diagram showing another example of the data hierarchy which may be used in the second embodiment for implementing the system of FIG. 9;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The words "module" and "unit", which are appended to terms describing components, are merely used for ease of explanation of the present invention and thus may be used interchangeably.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

Figure 1:
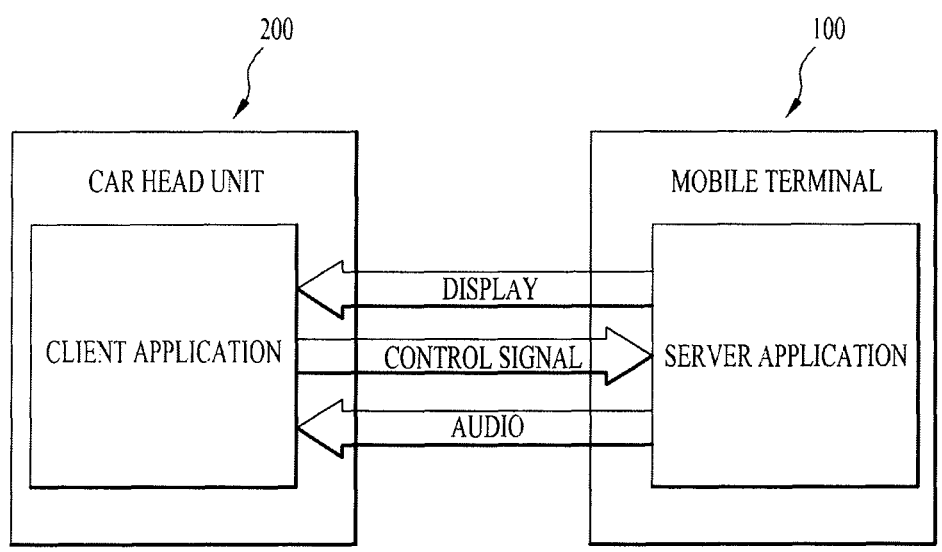
FIG. 1 is a schematic diagram of a data processing system including a display device and a mobile device according to an embodiment of the present invention.

FIG. 1 is a view schematically illustrating a data processing system including a mobile device (terminal) and an image display apparatus (display device) according to a first embodiment of the present invention.

As shown in FIG. 1, a data processing system according to a first embodiment of the present invention comprises a mobile terminal 100 and an image display apparatus 200.

The mobile terminal 100 may be connected to the image display apparatus 200 in a wired or wireless manner, and transmit at least one of a video signal and an audio signal to the image display apparatus 200.

The image display apparatus 200 is mounted to a vehicle in a fixed manner, and may be connected to the mobile terminal 100 in a wired or wireless manner to receive at least one of a video signal and an audio signal from the mobile terminal 100. And, the image display apparatus 200 may output at least one of a video signal and an audio signal received from the mobile terminal 100.

The image display apparatus 200 may receive an input from a user, and transmit the received input to the mobile terminal 100. For instance, once a user performs a touch input through a touch screen of the image display apparatus 200, the image display apparatus 200 may recognize a position where the touch input has been performed on a screen image, and may transmit information on the recognized position to the mobile terminal 100.

The mobile terminal 100 may determine the occurrence of a touch event at a position where the touch input has been performed, and may execute an operation corresponding to the generated touch event. That is, the user may control an operation of the mobile terminal 100 by using a touch screen, a hard key, etc. of the image display apparatus 200.

As one example of a data processing system, a user executes a road guiding application (or dialing, phonebook, e-mail, moving image play application, etc.) installed at the mobile terminal 100. Then, the mobile terminal 100 transmits an execution image of the road guiding application to the image display apparatus 200 so that the execution image of the road guiding application can be displayed on the image display apparatus 200.

The user may view the execution image of the road guiding application on a large screen of the image display apparatus 200, rather than on a small screen of the mobile terminal 100. And, the user may hear a road guiding sound through a speaker of the vehicle, rather than through a speaker of the mobile terminal 100.

Once the user selects a road guidance-related menu by using a touch screen or a hard key of the image display apparatus 200, the mobile terminal 100 may execute an operation corresponding to the menu. Then, the mobile terminal 100 may output an execution result with respect to the operation corresponding to the menu to the image display apparatus 200.

The mobile terminal 100 and the image display apparatus 200 may be connected to each other by using a short-range communication standard such as Bluetooth, a wireless internet standard such as Wi-Fi, an external device interface standard such as a universal serial bus (USB), and so on.

A server application for providing a service by a client' request may be installed at the mobile terminal 100, and a client application for accessing a service provided from a server may be installed at the image display apparatus 200.

The server application of the mobile terminal 100 is configured to capture a screen of the mobile terminal 100 regardless of an application type of the mobile terminal, and transmits the captured screen to the client application of the image display apparatus 200. And, the server application controls an operation of the mobile terminal 100 based on information received from the client application, the information on an event having occurred from the image display apparatus 200.

For instance, the image display apparatus 200 may remotely control the mobile terminal 100 in a virtual network computing (VNC) manner using a remote frame buffer (RFB) protocol which provides remote access with respect to graphical user interfaces. According to the VNC method, the mobile terminal 100 transmits a screen update to the image display apparatus 200 through a network, and transmits an event having occurred from the image display apparatus 200 to the mobile terminal 100.

And, the mobile terminal 100 may transmit an audio signal to the image display apparatus 200 or a headset or a hands-free, etc., according to an advanced audio distribution profile (A2DP) which defines a sound quality of an audio signal (stereo or mono) streamed to a second device from a first device through a Bluetooth connection, especially, a headset profile (HSP) relating to a Bluetooth headset, and a hands-free profile (HFP) applied to a hands-free for a vehicle, etc.

The mobile terminal 100 and the image display apparatus 200 may exchange additional information with each other based on additional protocols. For instance, the image display apparatus 200 may provide, to the mobile terminal 100, information on a vehicle status such as travel information, speed information and fuel information.

Applications installed at the mobile terminal 100 may be executed based on information on a vehicle status received from the image display apparatus 200 by using additional protocols. These applications may provide, to the image display apparatus 200, information on an application type (e.g., road guidance, multimedia, game, etc.), a graphic user interface (GUI) type (e.g., map, video, menu, etc.), an application status (e.g., execution status in a foreground or a background).

Figure 2:
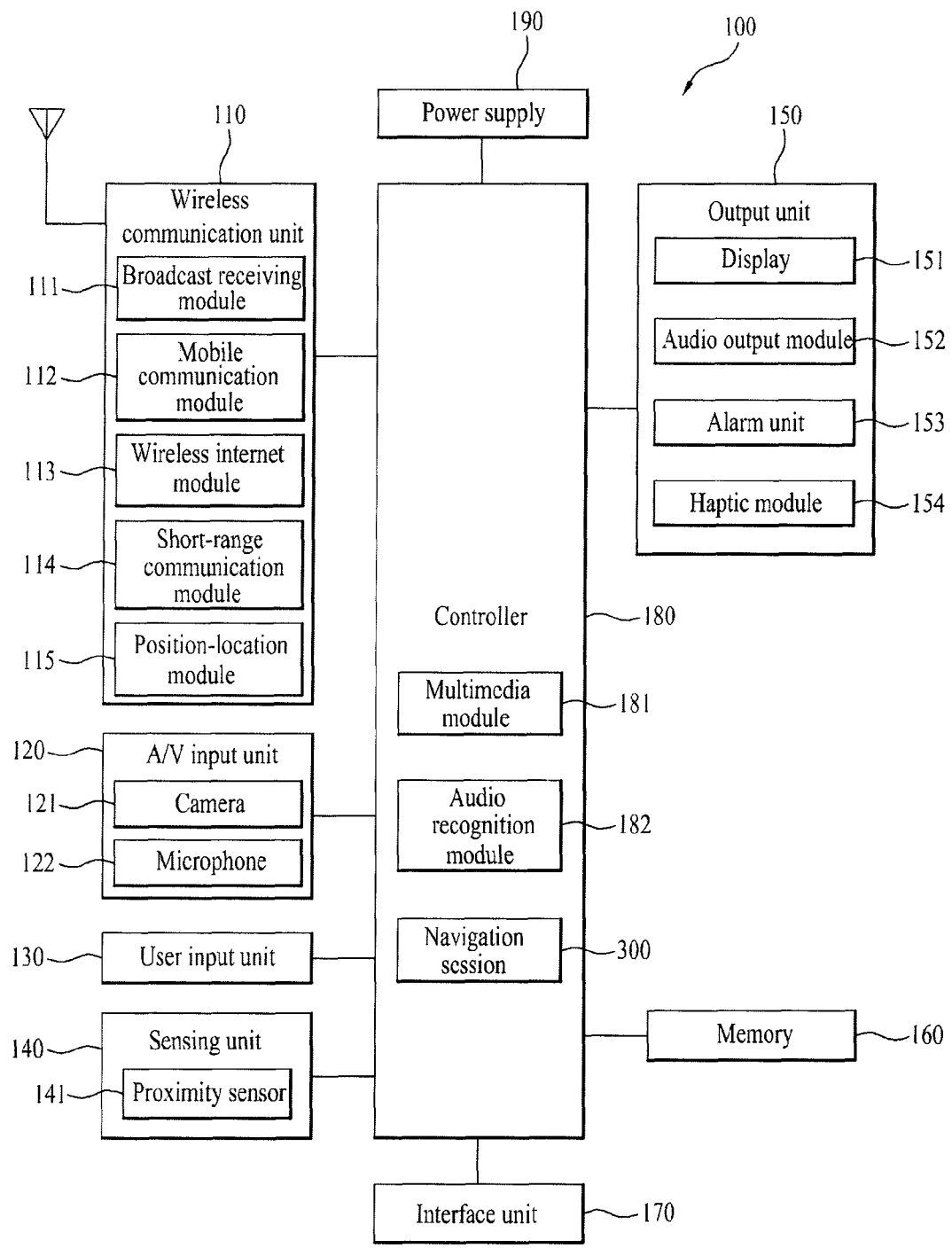
FIG. 2 is a diagram showing the configuration of a mobile device according to an embodiment of the present invention.

FIG. 2 is a block diagram illustrating a configuration of the mobile terminal 100 according to the present invention. The mobile terminal 100 may be configured in various manners. For instance, the mobile terminal 100 may be implemented as a portable phone, a smart phone, a notebook computer, a digital broadcasting terminal, personal digital assistants (PDA), a portable multimedia player (PMP), etc.

As shown in FIG. 2, the mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190. FIG. 2 illustrates the mobile terminal 100 having various components, but it is understood that implementing all of the illustrated components is not a requirement. The mobile terminal 100 may be implemented by greater or fewer components.

The wireless communication unit 110 includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or another type of storage medium).

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal. For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi positioning system and/or a hybrid positioning system may be used.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units 151. For example, the mobile terminal may include both an external display unit (not shown) and an internal display unit (not shown).

When the display unit 151 and a sensor for sensing a touch operation (hereinafter, will be referred to as 'touch sensor') are overlaid in a layered manner to form a touch screen, the display unit 151 may function as both an input device and an output device. The touch sensor may be a touch film, a touch sheet, a touch pad, etc.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

The proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Accordingly, if the pointer is in proximity to the touch screen without contacting the touch screen, the position of the pointer and a distance between the pointer and the touch screen may be detected. Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying the occurrence of events from the mobile terminal 100. The events occurring from the mobile terminal 100 may include call received, message received, key signal input, touch input, and so on. The alarm 153 may output not only video or audio signals, but also other types of signals such as signals notifying the occurrence of events in a vibration manner. For instance, the alarm 153 may be configured to vibrate responsive to the mobile terminal receiving a call or message. As another example, when a key signal has been inputted, the alarm 153 may output vibration as a feedback of the key signal input. Through this vibration output, a user may recognize the occurrence of an event. In order to output a signal in a vibration manner, the mobile terminal may be mounted with a vibrator. Here, the video signal or audio signal may be outputted through the display unit 151 or the audio output module 152.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100. For example, the haptic module 154 may be provided to a steering wheel, a gearshift, a lever, a seat, and the like.

The memory 160 may store a program for the processing and control of the controller 180. Alternatively, the memory 160 may temporarily store input/output data (e.g., phonebook data, messages, still images, video and the like).

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile terminal 100 or may be used to transfer data between the mobile terminal and an external device.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Processes described herein may be implemented in a computer-readable or its similar medium using, for example, software, hardware, or any combination thereof.

For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the controller 180.

For software implementation, the processes, such as procedures or functions, may be implemented together with separate software modules that allow performing of at least one function or operation. Software codes can be implemented by a software application (or program) written in any suitable programming language. The software codes may be stored in the memory 160 and executed by the controller 180.

An audio recognition module 182 is configured to recognize an audio signal generated from a user, and to execute a corresponding function according to the recognized audio signal.

A navigation session 300 applied to the mobile terminal 100 displays a travel path on map data.

Figure 3:
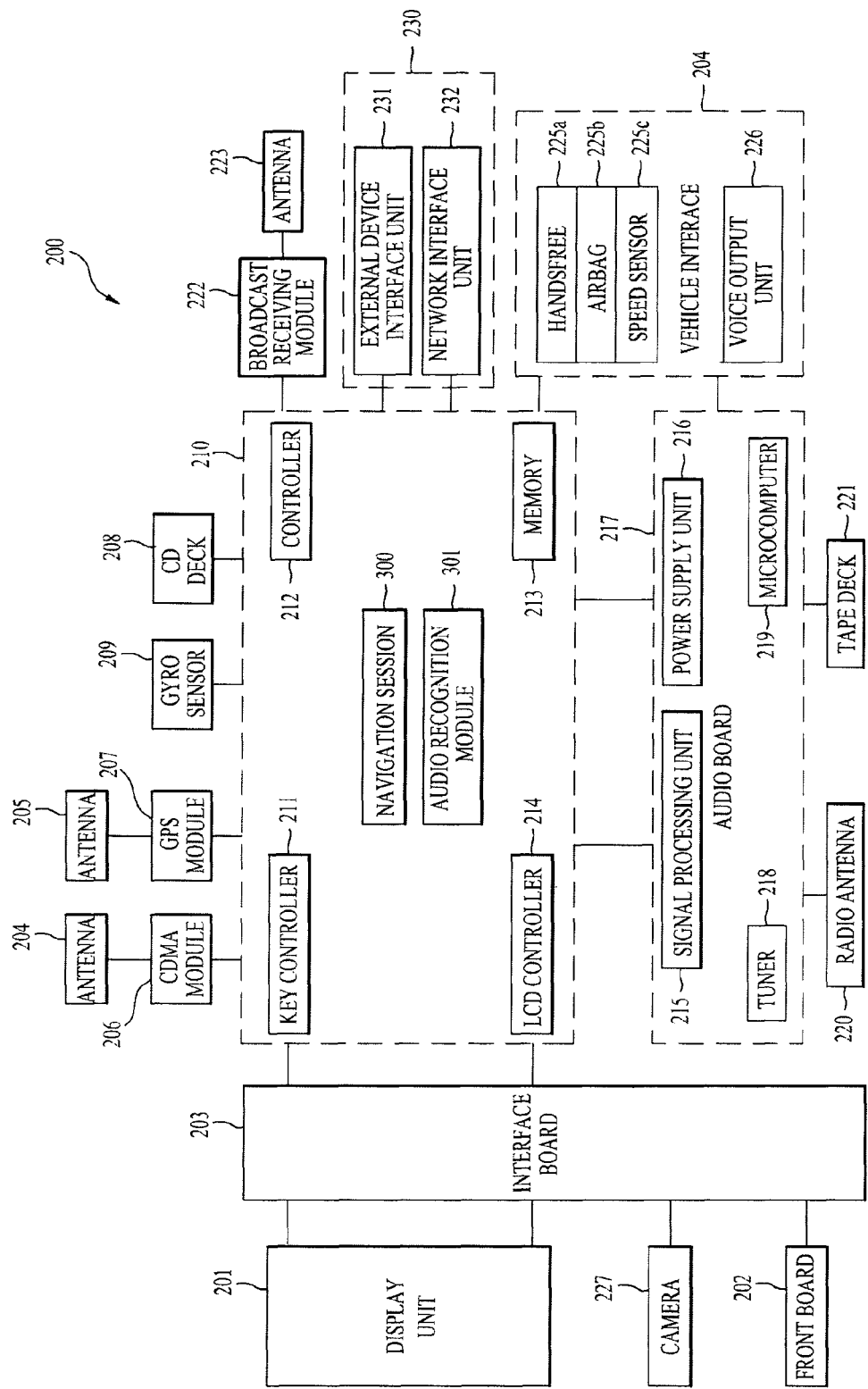
FIG. 3 is a diagram showing the configuration of a display device according to an embodiment of the present invention.

FIG. 3 is a block diagram illustrating a configuration of an image display apparatus 200 according to the present invention.

As shown in FIG. 3, the image display apparatus 200 comprises a main board 210 including a controller 212 configured to control an overall operation of the image display apparatus 200 (e.g., a central processing unit: CPU), a memory 213 configured to store therein programs for processing the controller 212 and input/output data, a key controller 211 configured to control each kind of key signals, and an LCD controller 214 configured to control a liquid crystal display (LCD).

The memory 213 may store therein map information (map data) for displaying road guidance information on a digital map. Also, the memory 213 may store therein a traffic information collection control algorithm for inputting traffic information according to a road condition in which a vehicle is currently traveling, and information for controlling the algorithm.

To the main board 210, may be connected a CDMA (code division multiple access) module 206 provided with a unique device number and mounted in a vehicle, a GPS module 207 configured to receive a GPS signal for guiding a position of a vehicle and tracking a travel path from a starting point to a destination point or to transmit traffic information collected by a user in the form of a global positioning system (GPS) signal, a CD deck 208 configured to play a signal recorded in a compact disk (CD), a gyro sensor 209, etc. The CDMA module 206 and the GPS module 207 may transmit or receive signals through antennas 204 and 205.

A broadcast signal receiving module 222 may be connected to the main board 210, and may receive a broadcast signal through an antenna 223. To the main board 210, may be connected a display unit (LCD) 201 controlled by the LCD controller 214 through an interface board 203, a front board 202 controlled by the key controller 211, and a camera 227 configured to capture inside and/or outside of a vehicle. The display unit 201 is configured to display each kind of video signals and text signals. The front board 202 is provided with buttons for inputting each kind of key signals, and supplies a key signal corresponding to a button selected by a user to the main board 210. And, the display unit 201 includes the proximity sensor and the touch sensor (touch screen) of FIG. 2.

The front board 202 may be provided with a menu key for directly inputting traffic information, and the menu key may be configured to be controlled by the key controller 211.

The audio board 217 is connected to the main board 210, and processes each kind of audio signals. The audio board 217 includes a micro computer 219 configured to control the audio board 217, a tuner 218 configured to receive a radio signal, a power unit 216 configured to supply power to the micro computer 219, and a signal processor 215 configured to process each kind of audio signals.

The audio board 217 includes a radio antenna 220 configured to receive a radio signal, and a tape deck 221 configured to play an audio tape. The audio board 217 may further include an audio output unit (e.g., amplifier) 226 configured to output an audio signal processed by the audio board 217.

The audio output unit (amplifier) 226 is connected to a vehicle interface 224. That is, the audio board 217 and the main board 210 are connected to the vehicle interface 224. To the vehicle interface 224, may be connected to a hands-free unit 225*a* for inputting an audio signal, an air bag 225*b* for a passenger's safety, a speed sensor 225*c* for detecting a vehicle speed, etc. The speed sensor 225*c* is configured to calculate a vehicle speed and to provide information on the calculated vehicle speed to the central processing unit 212.

The navigation session 300 applied to the image display apparatus 200 is configured to generate road guidance information based on map data and information on a current position of a vehicle, and to provide the generated road guidance information to a user.

The display unit 201 is configured to detect a proximity touch in a display window through a proximity sensor. For instance, when a pointer (e.g., a finger or a stylus pen) executes a proximity touch, the display unit 201 detects a position where the proximity touch has occurred and output position information corresponding to the detected position to the controller 212.

An audio recognition device (or audio recognition module) 301 is configured to recognize an audio signal (voice) generated from a user, and to perform a corresponding function according to the recognized audio signal.

The navigation session 300 applied to the image display apparatus 200 displays a travel path on map data. When the mobile terminal 100 is within a preset distance from a blind spot included in the travel path, the navigation session 300 automatically forms a wireless network with a terminal mounted to a peripheral vehicle (e.g., vehicle navigation system) and/or a mobile terminal held by a passerby through a wireless communication network (e.g., short-range wireless communication network). This may allow the navigation session 300 to receive position information of the peripheral vehicle from the terminal mounted to the peripheral vehicle, and to receive position information of the passerby from the mobile terminal held by the passerby.

The main board 210 may be connected to the interface unit 230, and the interface unit 230 may include an external device interface unit 231 and a network interface unit 232.

The external device interface unit 231 may connect an external device to the image display apparatus 200. For this, the external device interface unit 231 may include an A/V input/output unit (not shown) or a wireless communication unit (not shown).

The external device interface unit 231 may be connected to an external device in a wired or wireless manner, the external device such as a DVD (Digital Versatile Disk), a Blu ray, a game player, a camera, a camcorder and a notebook computer. The external device interface unit 231 transmits, to the controller 212, a video signal or an audio signal or a data signal input from the outside through the connected external device. And, the video signal or the audio signal or the data signal processed by the controller 212 may be output to the connected external device.

The A/V input/output unit may include a universal serial bus (USB) terminal, a CVBS (Composite Video Banking Sync) terminal, a component terminal, an S-video terminal (analogue), a DVI (Digital Visual Interface) terminal, an HDMI (High Definition Multimedia Interface) terminal, an RGB terminal and a D-SUB terminal, so that an audio signal and a video signal of an external device are input to the image display apparatus 200.

The wireless communication unit may perform a short-range wireless communication with other electronic device. For instance, the image display apparatus 200 may be connected to other electronic device through a network, according to a communication standard such as Bluetooth, RFID (Radio Frequency Identification), IrDA (infrared Data Association), UWB (Ultra Wideband), ZigBee and DLNA (Digital Living Network Alliance).

The external device interface unit 231 may be connected to various set-top boxes through one of the aforementioned terminals, thereby performing inputs and outputs with the set-top boxes.

The external device interface unit 231 may receive applications inside a neighboring external device or a list of applications, and transmit the received applications or list to the controller 212 or the memory 213.

The network interface unit 130 provides an interface for connecting the image display apparatus 100 to a wired/wireless network including an internet network. The network interface unit 130 may be provided with an Ethernet terminal for connection with a wired network, and may utilize communication standards such as WLAN (Wireless LAN) (Wi-Fi), Wibro (Wireless broadband), Wimax (World Interoperability for Microwave Access), and HSDPA (High Speed Downlink Packet Access) for connection with a wireless network.

The network interface unit 232 provides an interface for connecting the image display apparatus 200 to a wired or wireless network including an internet network. The network interface unit 232 may be provided with an Ethernet terminal for accessing a wired network, and may utilize a communication standard such as WLAN (Wireless LAN) (Wi-Fi), Wibro (Wireless broadband), Wimax (World Interoperability for Microwave Access) and HSDPA (High Speed Downlink Packet Access) for accessing a wireless network.

The network interface unit 232 may transmit or receive data to/from other user or other electronic device, through an accessed network or other network linked to an accessed network. Especially, the network interface unit 232 may transmit some of contents data stored in the image display apparatus 200, to a user or an electronic device selected from a plurality of users or electronic devices pre-registered in the image display apparatus 200.

The network interface unit 232 may access a predetermined web page through an accessed network or other network linked to an accessed network. More concretely, the network interface unit 232 may access a predetermined web page through a network thus to perform data transmission or data reception with a corresponding server. Also, the network interface unit 232 may receive contents or data provided from a contents provider or a network operator. More concretely, the network interface unit 232 may receive contents of a film, an advertisement, a game, a VOD, a broadcasting signal, etc. provided from a contents provider or a network provider through a network, and information relating to the contents. The network interface unit 232 may receive update information and an update file of a firmware provided from a network operator. The network interface unit 232 may transmit data to an internet or contents provider or a network operator.

And, the network interface unit 232 may receive, through a network, a desired application by selecting from applications open to the public.

Figure 4:
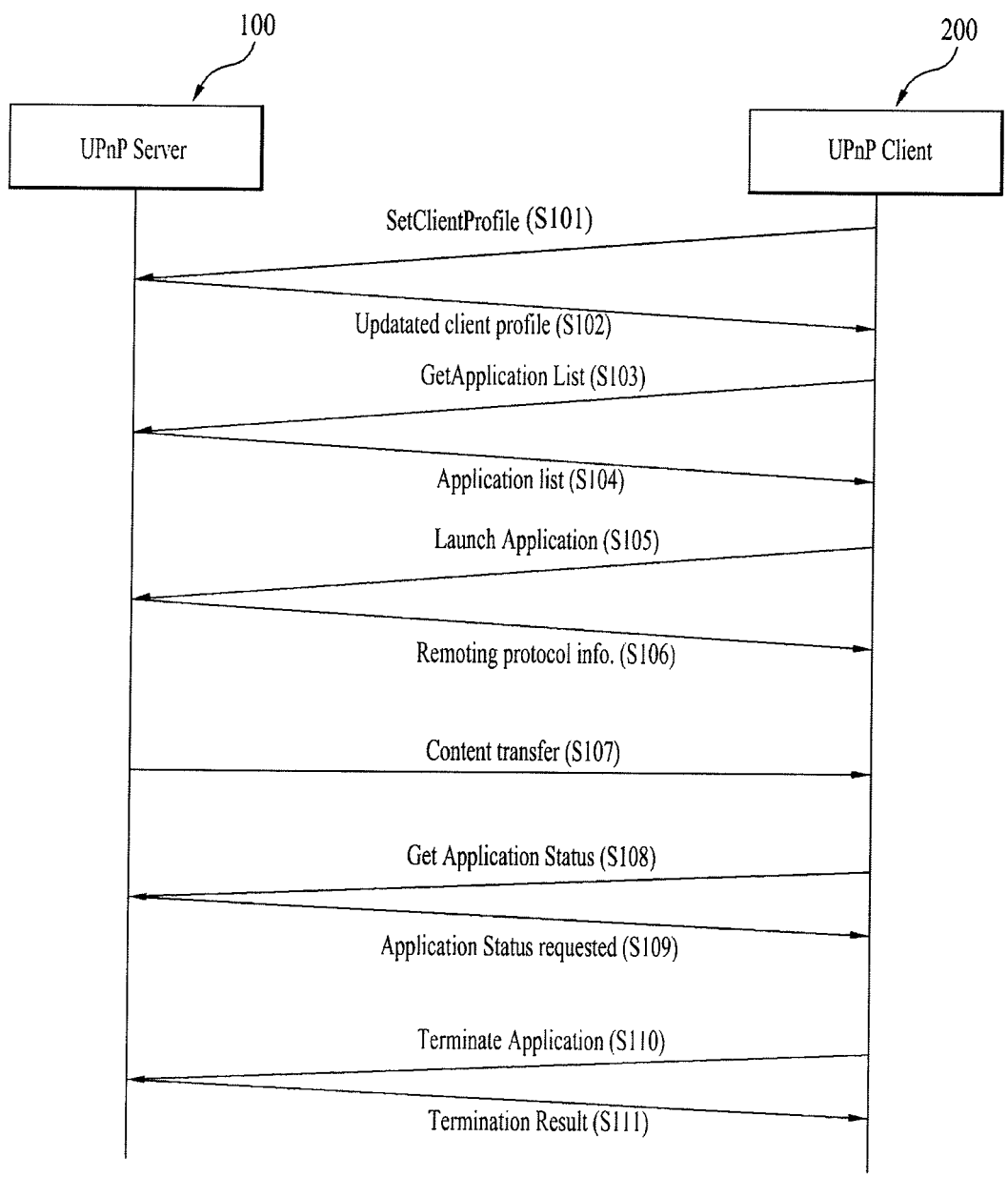
FIG. 4 is a diagram showing a sequence for application launch of a display device and a mobile device according to an embodiment of the present invention.

FIG. 4 is a diagram showing a sequence for application launch of a display device 200 and a mobile device 100 according to an embodiment of the present invention.

In FIG. 4, the display device 200 and the mobile device 100 are connected via Universal Plug and Play (UPnP).

UPnP is a technique for establishing a connection between devices located in the same subnet and, if a device is added to a local network, automatically connecting the device to another UPnP device. The main functions of UPnP include a device advertisement function for automatically finding a specific resource on a local network, a service action invocation function for remotely executing a specific function of a specific device or requesting information, a data subscription function for exchanging an event between devices, etc.

The sequence for application launch shown in FIG. 4 is a sequence for, at the display device 200, executing an application installed in the mobile device 100 as an example of the service action invocation function. The display device 200 and the mobile device 100 include a UPnP client 201 and a UPnP server 101, both of which perform a UPnP function, respectively.

First, the UPnP client 201 transmits a SetClientProfile command to the UPnP server 101 (S101). SetClientProfile registers a client profile of the UPnP client 201 with the UPnP server 101. The client profile is general information of the UPnP client 201 and includes network address information, transmittable and receivable data size information, icon information, etc. Details of the client profile will be described below with reference to FIG. 5.

The UPnP server 101 transmits an updated client profile to the UPnP client 201 (S102). The client profile of the UPnP client 100 registered with the UPnP server 200 is transmitted.

The UPnP client 201 transmits a GetApplication command to the UPnP server 101 (S103). GetApplication requests a list of applications executable in the UPnP client 201 among applications installed in the UPnP server 101.

The UPnP server 101 transmits the list of applications executable in the UPnP client 201 to the UPnP client 201 (S104). At this time, the application list may include application information, display information, remoting information, audio information, etc. Details of the application list will be described below with reference to FIG. 6.

The UPnP client 201 transmits a launch application for instructing the UPnP server 101 to execute a specific application (S105). A user may instruct execution of a specific application among the applications included in the application list. At this time, the UPnP client 201 instructs the UPnP server 101 to execute the specific application selected by the user via the launch application.

The UPnP server 101 transmits remoting protocol information to the UPnP client 201 (S106). The remoting protocol information includes information about a remoting protocol used between applications.

The UPnP server 101 transfers data generated by the execution of the application to the UPnP client 201 (content transfer, S107).

The UPnP client 201 transmits a GetApplicationStatus command for requesting status information of the specific application to the UPnP server 101 (S108), and the UPnP server 101 transmits the requested status information of the application to the UPnP client 201 (application status requested, S109).

Finally, the UPnP client 201 transmits a TermicateApplication command for terminating the specific application to the UPnP server 101 (S110). The UPnP server 101 terminates execution of the requested application and informs the UPnP client 201 of termination of the application (termination result, S111).

According to the sequence for application launch, the display device 200 may execute the specific application installed in the mobile device 100 and output an execution screen of the application to the display device 200.

FIG. 5 is a diagram showing a client profile according to an embodiment of the present invention.

The client profile is general information of the UPnP client 201 and includes connectivity information, real-time transport protocol (RTP) information, and icon preference, as shown in FIG. 5.

The connectivity information is communication connection information of the UPnP client 201 and includes Bluetooth MAC address (Bdaddr), information (startConnection) indicating whether to use Bluetooth as a basic channel for sending audio data.

The RTP information is information about a real time transport protocol (RTP) of the UPnP client 201 and includes supportable RTP Payload Type (payloadType), minimum buffer size information (audioIPL) necessary to play audio data received from the RTP back, maximum buffer size information (audioMPL) for buffering the audio data received from the RTP, etc.

The icon preference is information about an icon used in the UPnP client 201 and includes the kind of an icon image (mimetype), icon image size information (height, width), etc.

The UPnP client 201 registers the client profile of the UPnP client 201 with the UPnP server 101 via the SetClientProfile command and the UPnP server 101 communicates with the UPnP client 201 using the registered client profile.

FIG. 6 is a diagram showing an application list according to an embodiment of the present invention.

The application list is a list of applications executable in the UPnP client 201 among applications installed in the UPnP server 101 and includes application information, display information, remoting information, and audio information as attribute information of the application, as shown in FIG. 6.

The application information includes information (appCategory) about the category of the application executable in the UPnP client 201 and information (trustLevel) about a trust level of an application. Examples of the trust level (trustLevel) of the application include information indicating whether the application corresponds to an unknown application, a user configuration application, a self-registered application or a registered application.

The display information includes information (contentCategory) about the category of content provided by the application and information (contentRule) about the rule defining whether content shall be displayed.

The remoting information includes information (protocolID) about the remoting protocol to be used between applications and information (format) about a content type to be transmitted through the remoting protocol.

The audio information includes information about the type of audio content (audioType), information (audioCategory) about the category of audio content, and information (trustLevel) about the current trust level of the audio content.

Accordingly, the UPnP client 201 receives ApplicationList through the GetApplicationList command and the UPnP client 201 may confirm the kind and attribute information of the application executable in the UPnP client 201 via the received ApplicationList.

In the above description, the sequence for application launch for executing the specific application installed in the mobile device 100 at the display device 200 and outputting the information about the executed application to the display device 200 has been described.

Hereinafter, in order to share the screens of the mobile device 100 and the display device 200 with each other, a screen transmission system for transmitting screen information of the mobile device 100 or the display device 200 to the other device will be described.

That is, in the screen transmission system including the mobile device 100 and the display device 200, the screen information of the display device 200 connected to the mobile device 100 is transmitted to the mobile device 100 to be output or vice versa such that both devices provide the same screen to a user.

In the present specification, for example, the screen information of the mobile device 100 is transmitted to the display device 200.

The screen transmission system of the present invention may transmit the screen information of the mobile device 100 to the display device 200 using virtual network computing (VNC).

VNC is a remote frame buffer (RFB) protocol for sharing a frame buffer between remotely located devices, in which, if a client requests a current frame buffer over a network, a server captures the frame buffer and sends the frame buffer in a graphic format which may be understood by a client over the network. Thus, the screen is shared between both devices.

In the present specification, transmission of the screen information of the mobile device 100 to the display device 200 using VNC is referred to as a VNC service.

Figure 7:
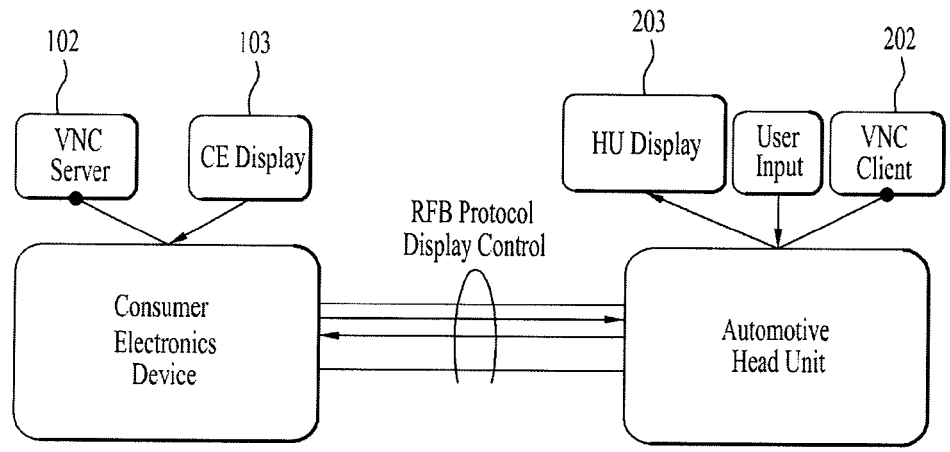
FIG. 7 is a schematic diagram of a screen transmission system of a display device and a mobile device according to an embodiment of the present invention.

FIG. 7 is a schematic diagram of a screen transmission system of a display device and a mobile device according to an embodiment of the present invention.

The mobile device 100 includes a VNC server 102 for performing the VNC service and an output unit (display) 103 for displaying a transmitted screen to a user. The display device 200 includes a VNC client 202 for performing the VNC service and an output unit (display) 203 for displaying a transmitted screen to a user.

The VNC server 102 and the VNC client 202 of the present invention may be implemented by controllers 180 and 212 of the devices or independent software modules.

The VNC server 102 and the VNC client 202 perform the VNC service for transmitting the screen information of the mobile device 100 or the display device 200 using VNC.

As described above, in order to provide the VNC service, the VNC server 102 or the VNC client 202 transmits screen information and display control information to the other device using the RFB protocol for sharing the frame buffer between remotely located devices. The display control information of the present invention may include information associated with the screen and information about the frame buffer of each device.

Figure 8:
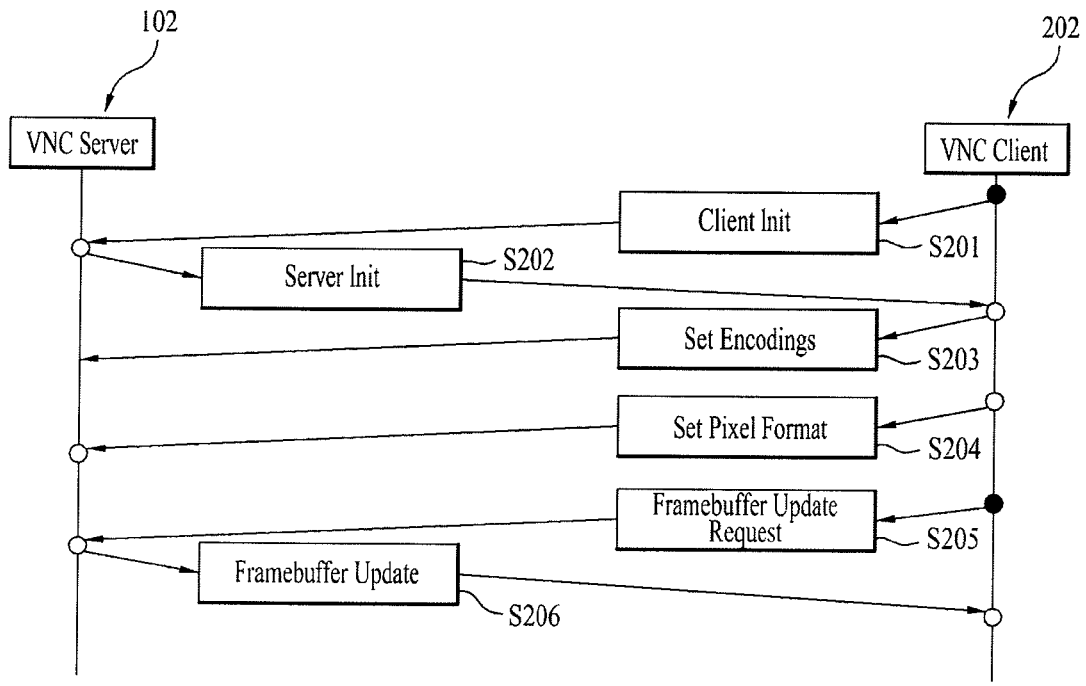
FIG. 8 is a diagram showing a VNC service according to an embodiment of the present invention.

FIG. 8 is a diagram showing a VNC service according to an embodiment of the present invention.

In the VNC service of the present invention configured to transmit the screen information of the mobile device 100 to the display device 200, the screen information of the mobile device 100 stored in the frame buffer of the mobile device 100 is transmitted to the display device 200.

The VNC service of the present invention may be performed through steps shown in FIG. 8. Referring to FIG. 8, the VNC service of the present invention will be described in detail.

First, a client init message including the size, name and color supporting information of the frame buffer of the display device 200 and the VNC client 202 is transmitted to the VNC server 102 (S201) and the VNC server 102 transmits a server init message including the size, name and color supporting information of the frame buffer of the mobile device 100 to the VNC client 202 (S202).

The VNC client 202 transmits a set encodings message including information about an encoding type supported by the display device 200 to the VNC server 102 (S203). Thus, the VNC server 102 encodes the screen information of the mobile device 100 in an encoding type supported by the image display apparatus 200 and transmits the encoded screen information.

The VNC client 202 transmits a set pixel format message including information about a compression method supported by the display device 200 to the VNC server 102 (S204). Thus, the VNC server 102 compresses the screen information of the mobile device 100 using the compression method supported by the display device 200 and transmits the compressed screen information.

The VNC client 202 transmits, to the VNC server 102, a framebuffer update request message including information for requesting update of the screen information of the mobile device 100 from the frame buffer of the mobile device 100 (S205).

The VNC client 202 updates the current screen information of the mobile terminal 100 in the frame buffer when receiving the framebuffer update request message.

The VNC server 102 transmits, to the VNC client 202, a framebuffer update message including information indicating that the screen information has been updated in the frame buffer of the mobile terminal 100 and information about the updated frame buffer (S206).

Then, the VNC client 202 retrieves the screen information of the mobile device 100 from the updated frame buffer of the mobile device and outputs the screen information to the display device 200.

As described above, in the VNC service of the present invention, various messages are exchanged between the VNC server 102 and the VNC client 202 to perform the VNC service.

Figures 9, 10:
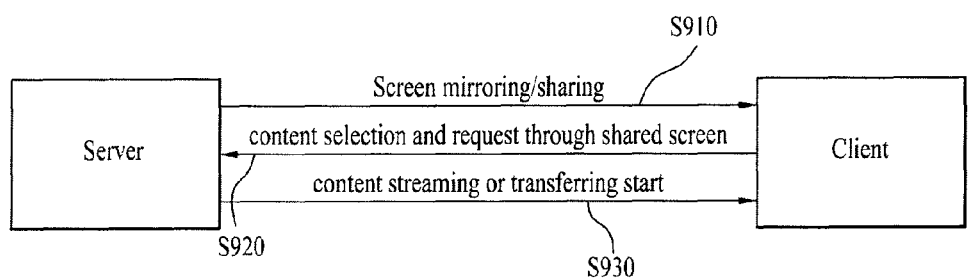
FIG. 9 is a diagram showing data transmission flow between a client and a server according to another embodiment of the present invention.
FIG. 10 is a diagram showing an embodiment of a data hierarchy which may be used in a first embodiment for implementing the system of FIG. 9.

FIG. 9 is a diagram showing data transmission flow between a client and a server according to another embodiment of the present invention.

In particular, another embodiment of the present invention relates to a solution for, at a client, equally providing a file hierarchy or user interface of a server using a screen mirroring/sharing. Those skilled in the art may implement this embodiment by referring to FIGS. 9 to 15. Of course, other embodiments of the other figures are within the scope of the present invention.

A server shown in FIG. 9 corresponds to a mobile device, a client corresponds to a display device and the display device may be, for example, a portable multimedia player (PMP), a navigation device, etc. mounted in a car.

First, screen mirroring connection is established between the server and the client (S910). For screen mirroring connection, for example, VNC, Wi-Fi display, high definition multimedia interface (HDMI) or mobile high-definition link (MHL) may be used. Accordingly, an image displayed on the screen of the server is sent to the client without change.

The client selects specific content via the shared screen and requests associated metadata (S910). The server starts to stream or transfer the requested specific content (S930). The term "content" may be replaced with the term "object". The object may be any data entity that can be returned by a ContentDirectory service from a browsing or searching action. The ContentDirectory service may define a class system to represent the different types of objects that are managed by the ContentDirectory service.

Further, a screen excluding video content is implemented by image copy using the above-described mirroring technique, and video content requiring a high frame rate is directly streamed or transferred from the server to the client. Accordingly, the client may process the video content similarly to a stored local file, thereby improving data processing rate and performance.

In addition, in order to equally implement a user interface and file hierarchy provided by the server even in the client, a part of a data hierarchy transmitted by the server and the client needs to be changed or a new data hierarchy needs to be added. Two embodiments will now be described in detail.

FIG. 10 is a diagram showing an embodiment of a data hierarchy which may be used in a first embodiment for implementing the system of FIG. 9. In the first embodiment, a ContentDirectory service defined in UPnP is corrected and is combined with a screen mirroring technique.

For example, if a screen mirroring connection is established between a client (e.g., a display device) and a server (e.g., a mobile device), the client displays the screen of the server. At this time, when a user finds and selects a desired file, a state variable of SelectedObject shown in FIG. 10 is transmitted. The state variable of SelectedObject includes meta information (or metadata) of a selected object. Detailed examples of the metadata will be described with reference to FIG. 11.

FIG. 11 is a diagram showing another example of the data hierarchy which may be used in the first embodiment for implementing the system of FIG. 9. FIG. 11 shows metadata defined according to the variable defined in FIG. 10, which is represented by a DIDL (Digital Item Declaration Language)-Lite XML document.

The DIDL-Lite XML document shown in FIG. 11 defines metadata necessary to process the selected object and may be replaced with another data hierarchy by those skilled in the art.

<res protocolInfo="rtsp-rtp-udp:*:MPV:*"> and <res protocolInfo="http-get:*video/mpeg:*"> shown in FIG. 11 informs the client of the type of the protocol provided by the server. Accordingly, from the viewpoint of the client, it is advantageous that the client determines whether the client may support a protocol necessary to process the selected object in advance.

Figure 12:
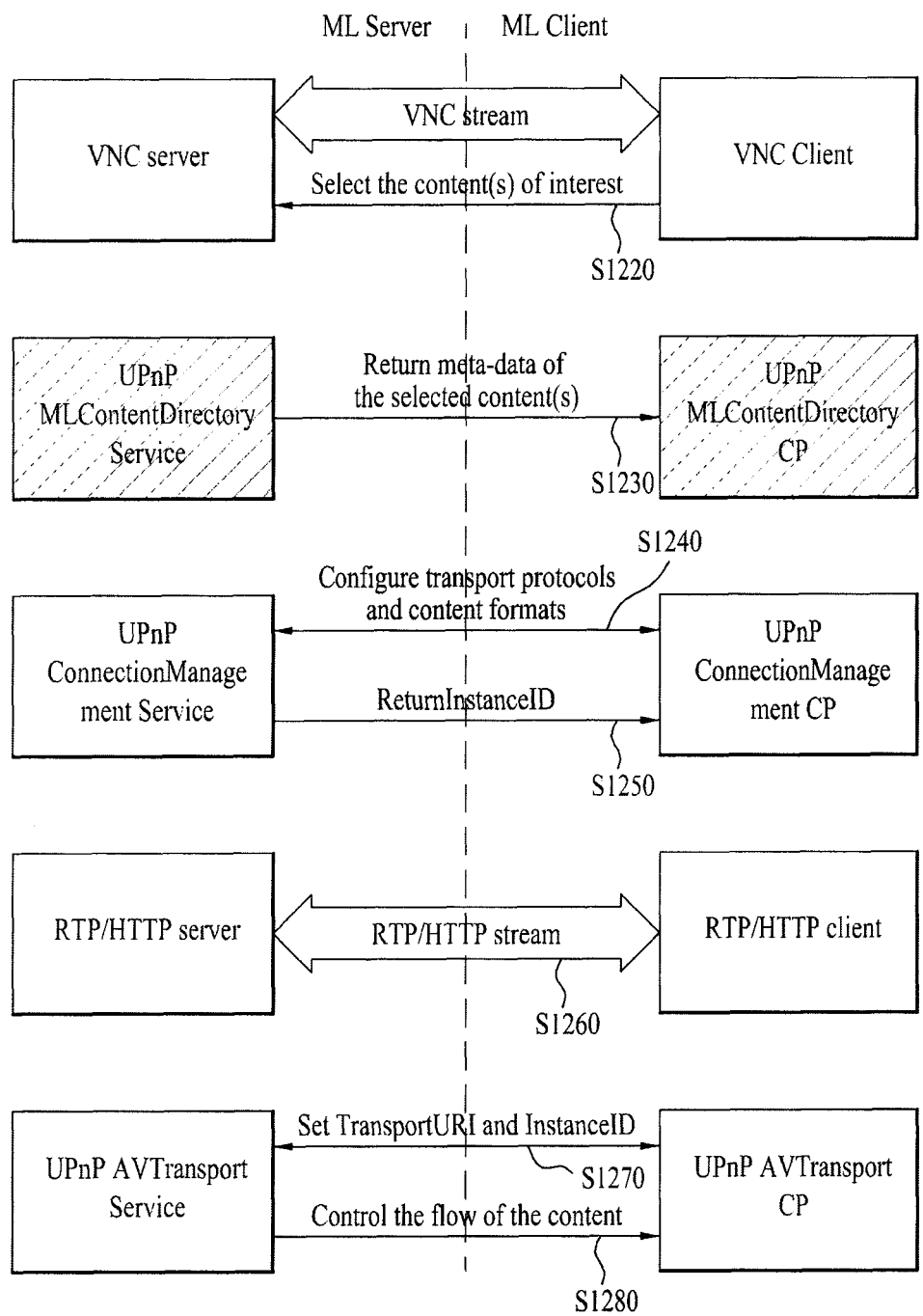
FIG. 12 is a diagram showing a data processing procedure of a system using the data hierarchy of FIGS. 10 and 11.

FIG. 12 is a diagram showing a data processing procedure of a system using the data hierarchy of FIGS. 10 and 11. As described with reference to FIGS. 10 and 11, the overall data flow in the case in which the corrected ContentDirectory service is used will now be described with reference to FIG. 12. In particular, unlike the related art, according to the first embodiment of the present invention, step S1230 is added.

First, as shown in FIG. 12, a VNC stream is designed to be transmitted and received between the server and the client (S1210). It is assumed that mirroring connection is established between the server and the client.

At this time, any one of one or more pieces of content displayed on the screen of the client is selected and a corresponding request signal is transmitted to the server (S1220). Accordingly, the server transmits metadata of the selected content (or the object) to the client (S1230). An example of the transmitted data is shown in FIG. 11 and the state variable used therefor is shown in FIG. 10.

Further, the server and the client transmit and receive transport protocols and content formats to/from each other (S1240) and the server transmits an instance ID corresponding to the specific object to the client (S1250).

An RTP/HTTP stream is transmitted and received between the server and the client (S1260) and the client and the server transmit and receive a set transport URI and an instance ID to each other. Accordingly, an object and protocol for processing are decided.

Finally, a command for controlling the selected object (content) is transmitted from the server to the client. The command corresponds to execution, pause or stop, for example.

FIG. 13 is a diagram showing an example of a data hierarchy which may be used in a second embodiment for implementing the system of FIG. 9. In the second embodiment, a new service which may be used in UPnP is additionally defined to maximize the effect of the screen mirroring function. Accordingly, the variables shown in FIG. 13 may be used for the new UPnP service.

First, the state variables shown in FIG. 13 are a protocol agreed for processing an action between the server and the client. In addition, in FIG. 13, R/O (Required/Optional) is defined, but, as needed by those skilled in the art, a variable defined as R (required) may be used as O (Optional), and vice versa.

A SelectedObject variable defined in FIG. 13 defines meta information of the selected object. In the present invention, meta information and metadata may have the same meaning.

A SourceProtocolInfo variable defined in FIG. 13 defines the available transport and content format of the selected object.

An A_ARG_TYPE_ProtocolInfo variable defined in FIG. 13 defines the available transport and content format of the selected object.

SourceProtocolInfo and A_ARG_TYPE_ProtocolInfo are variables specifying protocol information and are different depending on whether this is a return variable or an argument variable of a UPnP action. For example, a related state variable of protocolInfo among arguments of SetProtocolInfo is A_ARG_TYPE_ProtocolInfo and a related state variable of ProtocolInfoAgreed which is the return variable of the action is SourceProtocolInfo.

An A_ARG_TYPE_ConnectionID variable defined in FIG. 13 defines an identifier of a connection established for media streaming or file transfer.

An A_ARG_TYPE_RcsID variable defined in FIG. 13 defines an identifier of the client that will get media content or files.

A CurrentObjectStatus variable defined in FIG. 13 defines the status of the current object.

FIG. 14 is a diagram showing another example of the data hierarchy which may be used in the second embodiment for implementing the system of FIG. 9. Actions for utilizing the variables defined in FIG. 13 are shown in FIG. 14. R/O (Required/Optional) is defined, but, as needed by those skilled in the art, a variable defined as R (required) may be used as O (Optional), and vice versa. This is also included in the scope of the present invention. Further, the actions defined in FIG. 14 may be implemented by data transmitted from the display device (client) to the mobile device (server).

A GetProtocolInfo action defined in FIG. 14 requests content format support of the server.

A SetProtocolInfo action defined in FIG. 14 provides the server with content formats that can be used for the connection. If SetProtocolInfo is null, the client may not process the selected object. That is, a codec used for the object is not supported by the client.

A play action defined in FIG. 14 plays the current object.

A pause action defined in FIG. 14 pauses the current object.

A stop action defined in FIG. 14 stops the current object.

A GetMediaInfo action defined in FIG. 14 requests metadata of an object.

Figure 15:
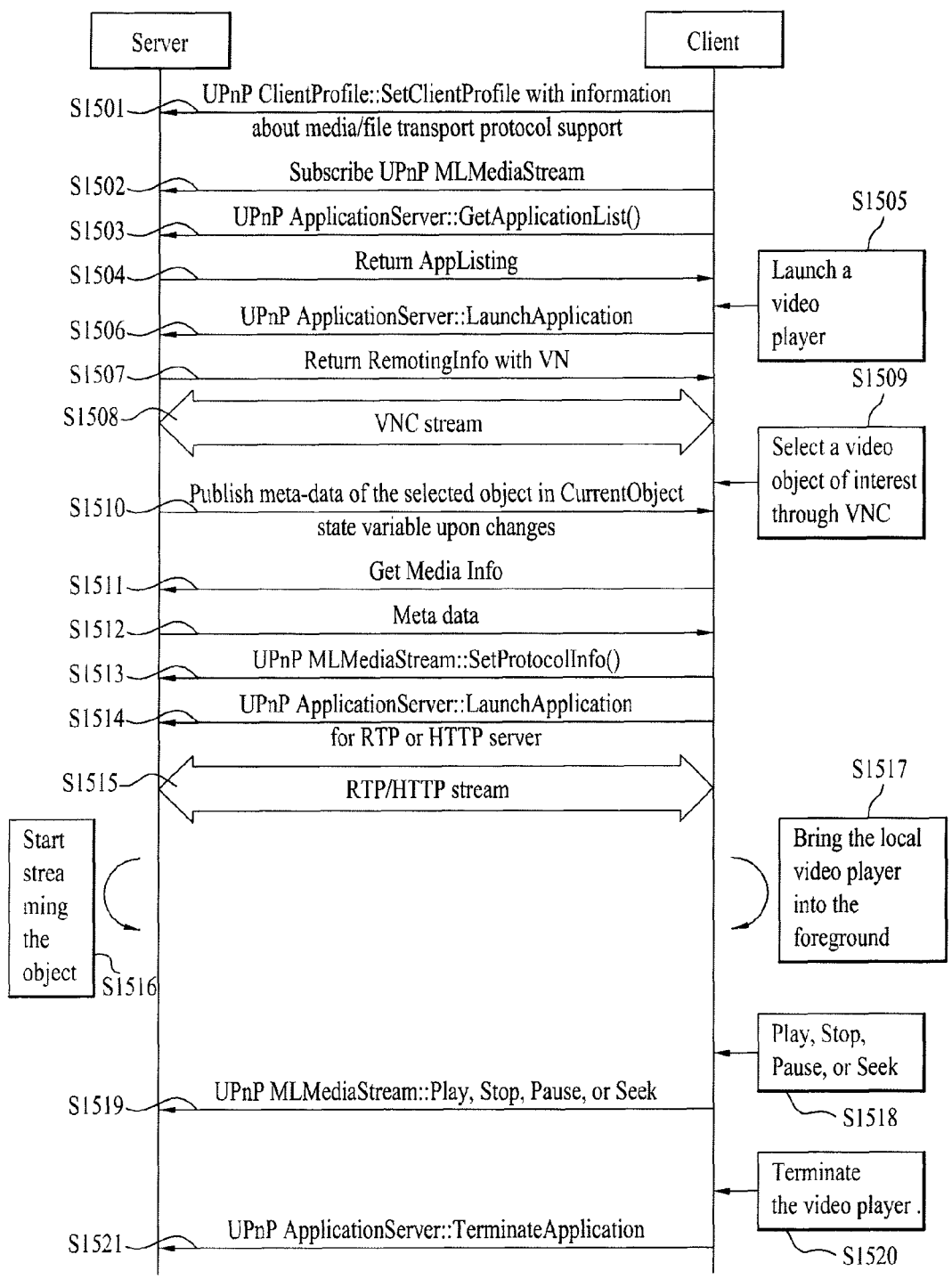
FIG. 15 is a diagram showing a data processing procedure of a system using the data hierarchy of FIGS. 13 and 14.

FIG. 15 is a diagram showing a data processing procedure of a system using the data hierarchy of FIGS. 13 and 14. As described with reference to FIGS. 13 and 14, the overall data flow in the case in which a newly defined UPnP service is used will now be described with reference to FIG. 15. In particular, unlike the related art, according to the second embodiment of the present invention, steps S1511 and S1512 are added.

Although VNC, UPnP, etc. is described as an example of mirroring connection, the scope of the present invention is not limited to a specific protocol.

First, the client (the display device) transmits a client profile to the server (the mobile device) along with information about a supported media/file transport protocol (S1501). In addition, the client transmits a media stream and GetApplicationList for mirroring to the server (S1502 and S15030. GetApplicationList has been described with reference to FIG. 4.

Accordingly, the server returns AppListing to the client (S1504). At this time, the client launches a video player (S1505). In addition, the client transmits LaunchApplication to the server (S1506). LaunchApplication has been described with reference to FIG. 4.

The server transmits RemotingInfo to the client (S1507). A VNC stream is transmitted and received between the server and the client (S1508). At this time, the client selects a video object of interest through VNC (S1509). As described above, since the file hierarchy or user interface provided by the server is equal to the file hierarchy or user interface output from the client, a user may rapidly and easily select a desired object. The object may be selected using the client, instead of the server for storing the object.

The server transmits the metadata of the selected object to the client (S1510). As the method of implementing step S1510, the GetMediaInfo action shown in FIG. 14 may be used. That is, the client transmits GetMediaInfo to the server (S1511). The metadata of the specific object is transmitted from the server to the client (S1512).

Further, the client transmits SetProtocolInfo described in FIG. 14 to the server (S1513) and transmits LaunchApplication for the RTP or HTTP server to the server (S1514). Accordingly, an RTP/HTTP stream may be transmitted and received between the server and the client (S1515).

In addition, the server starts streaming of the object (S1516) and the client brings the local video player into the foreground (S1517).

If the user selects a play, stop or pause function using the client (S1518), the client transmits a command to the server using the actions shown in FIG. 14 (S1519).

Finally, if the user terminates the executed video player using the client (S1520), TerminateApplication data is transmitted from the client to the server (S1521). The TerminateApplication data has been described with reference to FIG. 4.

Although those skilled in the art may implement the present invention based on the description of FIGS. 9 to 15, for convenience of description, several additional descriptions will be given with reference to FIGS. 16 to 22.

Figure 16:
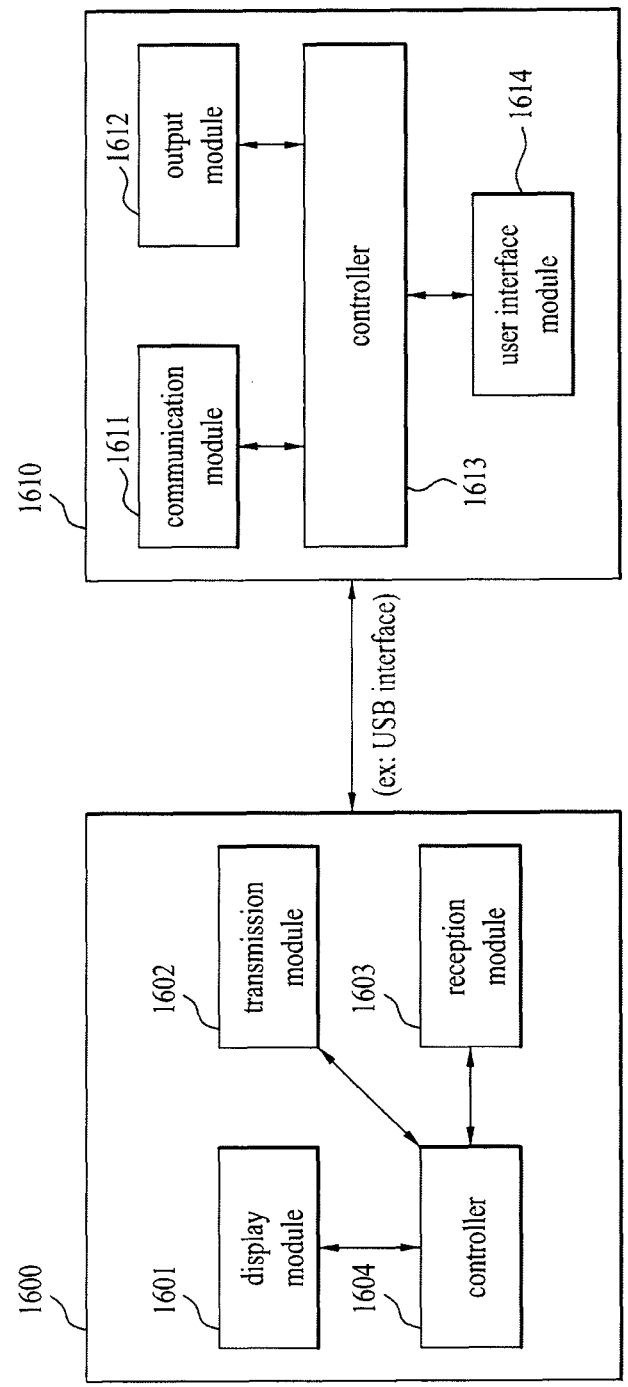
FIG. 16 is a diagram showing the internal configurations of a client and a server shown in FIG. 9 in detail.

FIG. 16 is a diagram showing the internal configurations of a client and a server shown in FIG. 9 in detail. Although FIG. 16 is applicable to both the first embodiment and the second embodiment, for convenience of description, the second embodiment will be focused upon.

As shown in FIG. 16, a mobile device 1600 includes a display module 1601, a transmission module 1602, a reception module 1603 and a controller 1604. Further, a display device 1610 includes a communication module 1611, an output module 1612, a controller 1613 and a user interface module 1614. Some components may be changed or omitted or new components may be added without departing from the scope of the present invention.

The communication module 1611 of the display device 1610 which performs data communication with the mobile device 1600 establishes mirroring connection with the mobile device 1600.

The output module 1612 displays the current screen of the mobile device 1600 and the user interface module 1614 receives a command for selecting a first location value.

The controller controls the communication module 1611 to transmit at least one command for controlling a specific object corresponding to the first location value to the mobile device 1600.

Further, the controller 1613 controls the output module to output at least one of video data or audio data associated with execution of the specific object.

The at least one command includes at least one of first information for requesting a content format supported by the mobile device 1600, second information for providing a content format available for connection between the mobile device 1600 and the display device 1610 to the mobile device, third information for requesting metadata of the specific object or fourth information for controlling execution of the specific object, all of which have been described with reference to FIGS. 13 and 14.

If the second information is null, this indicates that the display device cannot process the specific object. The second information corresponds to SetProtocolInfo shown in FIG. 14.

As shown in FIG. 15, after mirroring connection is established, a VNC stream is set up for communication. Further after the specific object is selected using VNC, an RTP or HTTP stream is set up for communication.

The mobile device 1600 and the display device 1610 are physically connected through a USB and the display device 1610 is mounted in a car.

The display module 1601 of the mobile device 1600 which performs data communication with the display device outputs the current screen including at least one object.

If mirroring connection with the display device 1610 is established, the transmission module 1602 transmits an image corresponding to the current screen to the display device 1610.

The reception module 1603 receives at least command for controlling the specific object from the display device. The controller 1604 is designed to execute the specific object based on the received at least one command.

Further, the controller 1604 detects the selected specific object using the user interface module of the display device 1610 using a coordinate value received from the display device 1610. If a mirroring technique is used, since it is difficult for the mobile device 1600 to immediately detect the selected specific object through the display device 1610, there is a need for a process of estimating the location of the object using the coordinate value.

Figure 17:
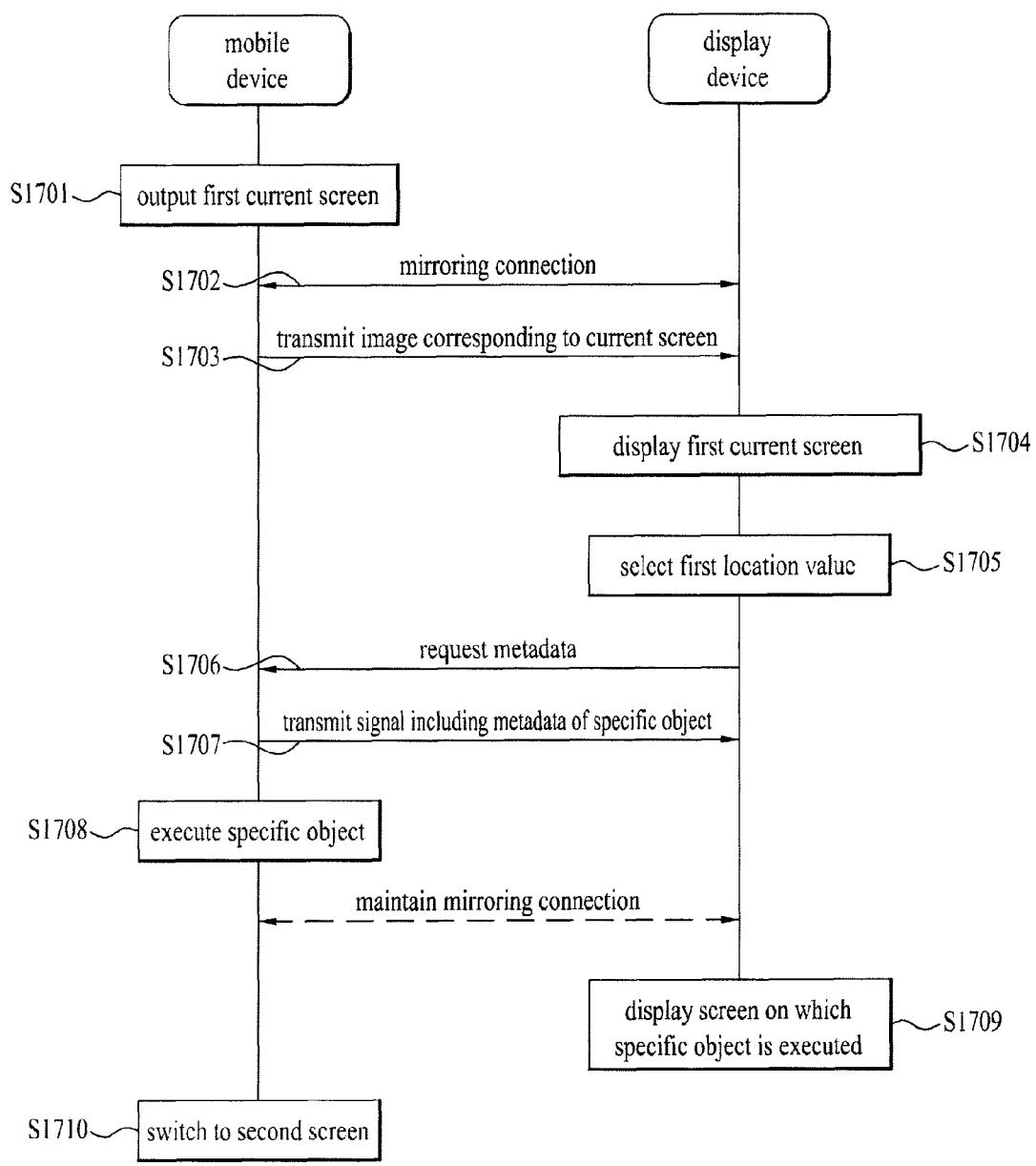
FIG. 17 is a flowchart illustrating a data processing procedure between a client and a server shown in FIG. 9 in detail.

FIG. 17 is a flowchart illustrating a data processing procedure between a client and a server shown in FIG. 9 in detail. Although FIG. 17 is applicable to both the first embodiment and the second embodiment, for convenience of description, the first embodiment will be focused upon.

As shown in FIG. 17, the mobile device which performs data communication with the display device outputs a current screen including at least one object (S1701).

If mirroring connection is established between the display device and the mobile device (S1702), the mobile device transmits an image corresponding to the current screen to the display device (S1703).

The display device displays the same screen as the first current screen of the mobile device (S1704).

If the first location value is selected through the user interface of the display device (S1705), metadata is requested (S1706).

At this time, the mobile device transmits a signal including the metadata of the specific object to the display device (S1707). In addition, the mobile device executes the specific object (S1708).

Accordingly, the screen on which the specific object is executed is equally displayed on the screen of the display device (S1709) and the screen of the mobile device is switched to a second screen different from the first screen (S1710).

Although not shown in FIG. 17, a step of, at the mobile device, detecting the selected specific object through the user interface module of the display device using the coordinate value received from the display device is further included. For example, the step of detecting the selected specific object is performed after step S1706 without departing from the scope of the present invention.

The signal of step S1707 includes at least one piece of protocol identification information supported by the mobile device.

The signal is added as the status variable (statevariable) of a content directory service defined in UPnP, for example, which has been described with reference to FIGS. 10 and 11.

The object may define data returned by the content directory service from a browsing action or a searching action for example. The term "content" may be used instead of the term "object".

FIGS. 18 to 22 are diagrams showing screens of a client and a server implemented according to an embodiment of the present invention. FIGS. 18 to 22 are sequentially described, but the present invention is not limited to the order of figures.

Figure 18:
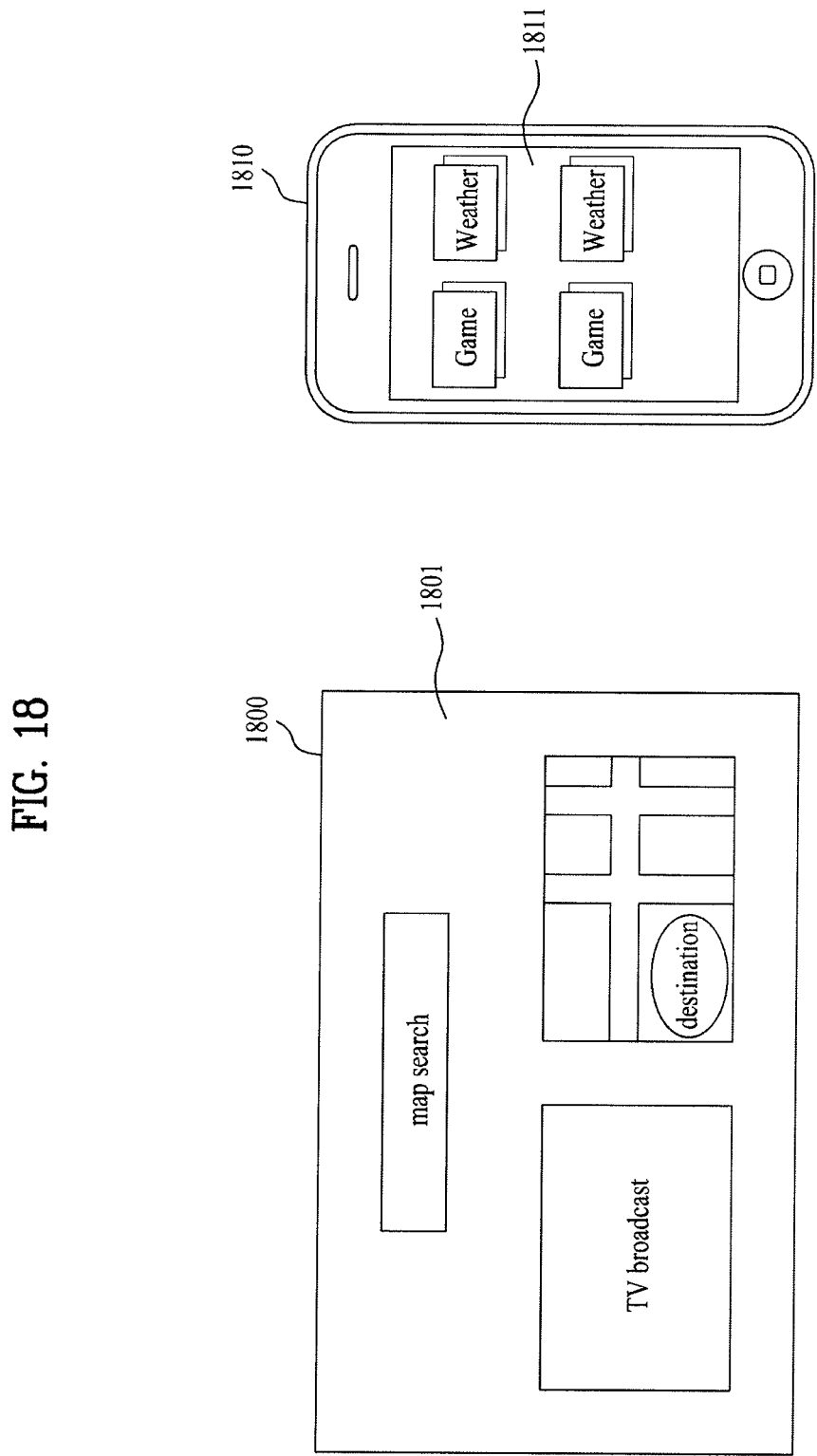
FIGS. 18 to 22 are diagrams showing screens of a client and a server implemented according to an embodiment of the present invention.

First, as shown in FIG. 18, a client 1800 and a server 1810 display different screens. The client 1800 may be a navigation device or PMP mounted in a car for example. The server may be a smart phone, a mobile phone, a tablet PC, etc. possessed by a user or driver who gets into the car.

Various applications, content, objects, etc. are displayed on the screen 1811 of the server 1810 and a TV broadcast, a map search window, etc. is displayed on the screen 1801 of the client 1800. The user or driver who gets into the car does not connect the server 1810 and the client 1800 yet.

Figure 19:
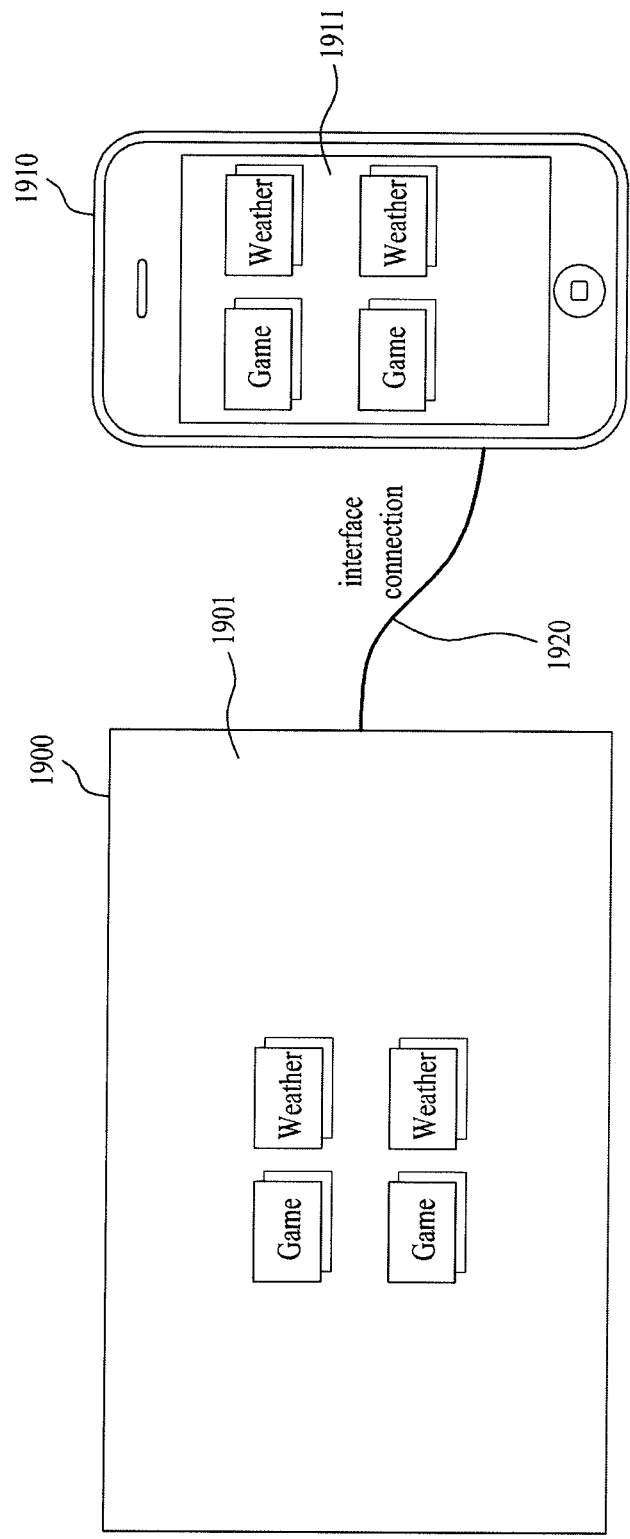

Further, as shown in FIG. 19, it is assumed that a client 1900 and a server 1910 are connected to a wired or wireless interface 1920. At this time, a USB interface may be used as an example of the interface 1920. According to the above-described mirroring technique, the screen displayed on the screen 1911 of the server 1910 is equally displayed on the screen 1901 of the client 1900.

Figure 20:
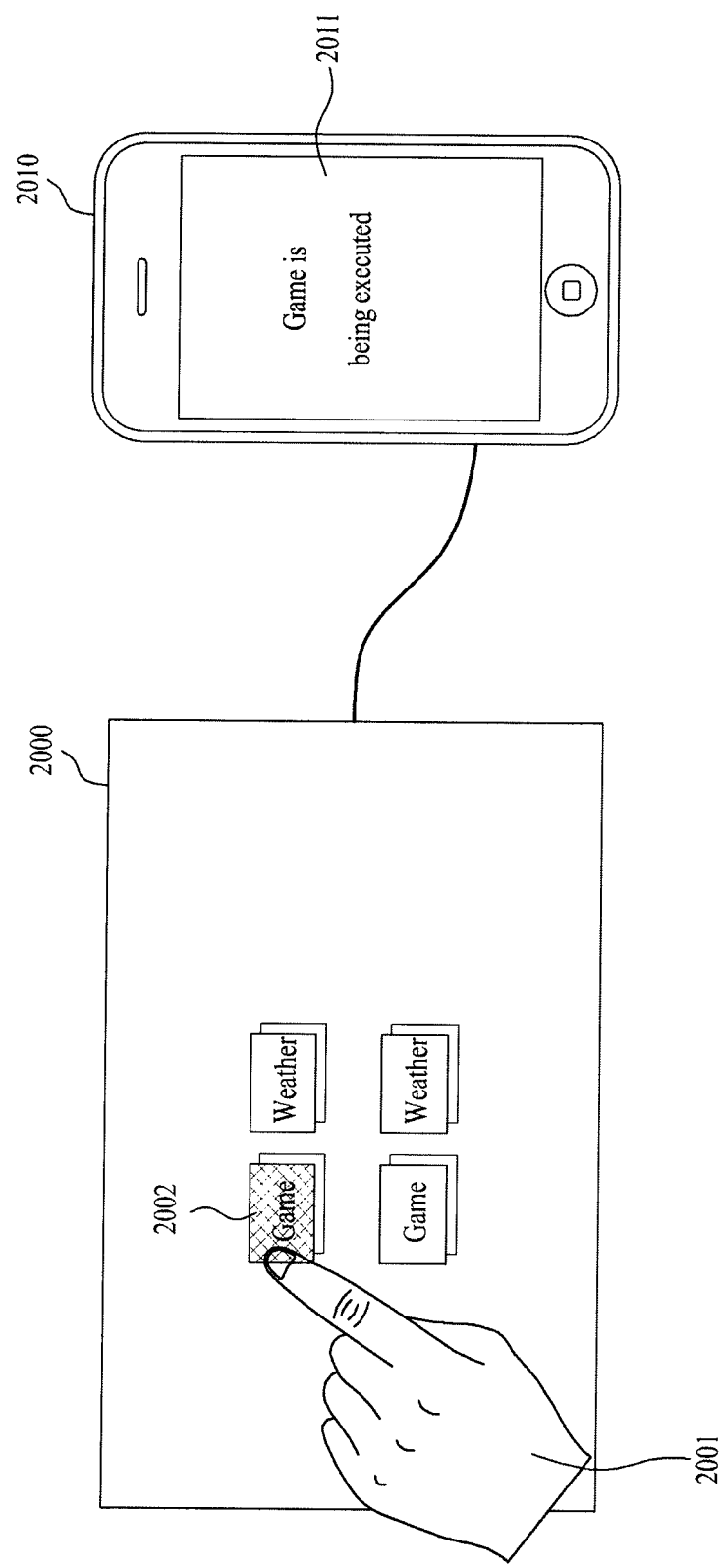

Accordingly, as shown in FIG. 20, the user or driver may control the client 2000 without using the server 201 and execute any object stored in the server 2010. For example, if the user or driver 2001 selects a specific object 2002 displayed on the screen of the client 2000, the server 2010 for storing the specific object executes the specific object. At this time, as shown in FIG. 20, the server 2010 outputs a message 2011 indicating that the specific object is being executed. Of course, the same message may be displayed on the screen of the client 2000 according to the mirroring technique.

Figure 21:
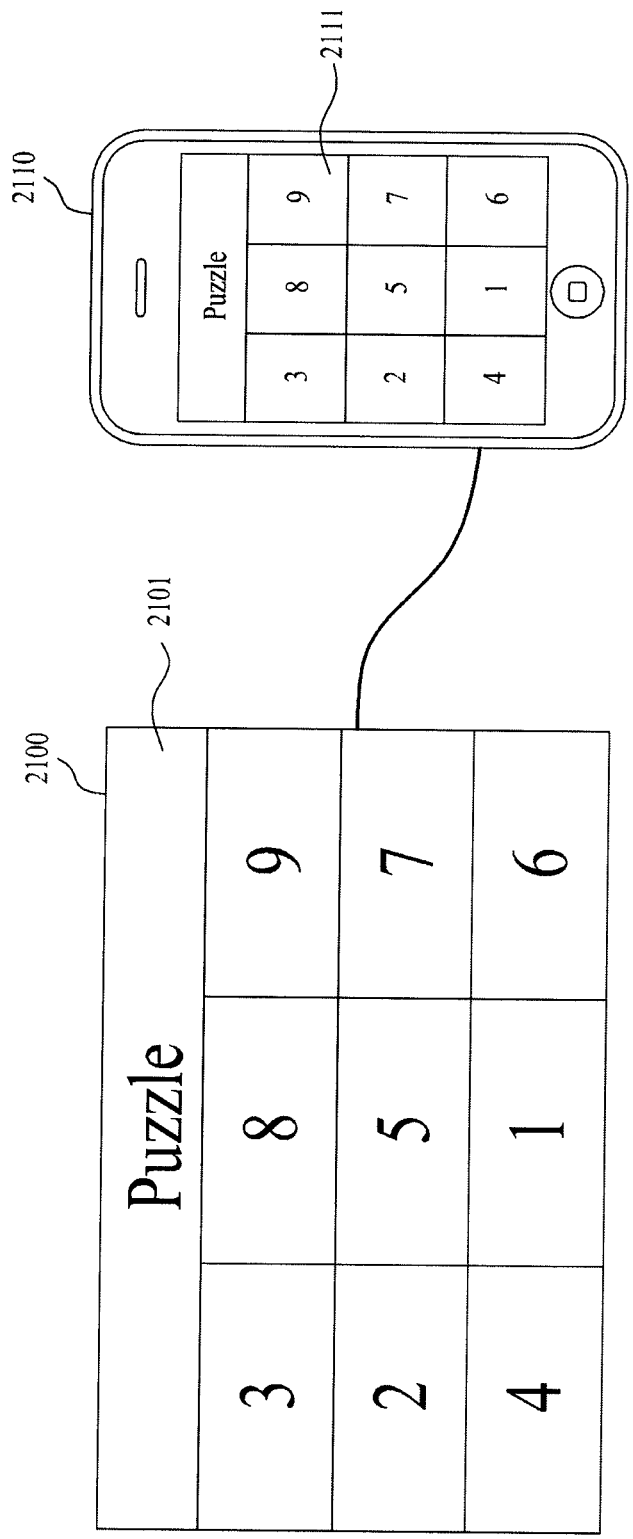

In addition, if preparation for executing the specific object is completely made, as shown in FIG. 21, the execution image of the specific object are equally displayed on the screens 2101 and 2111 of the client 2100 and the server 2110.

Figure 22:
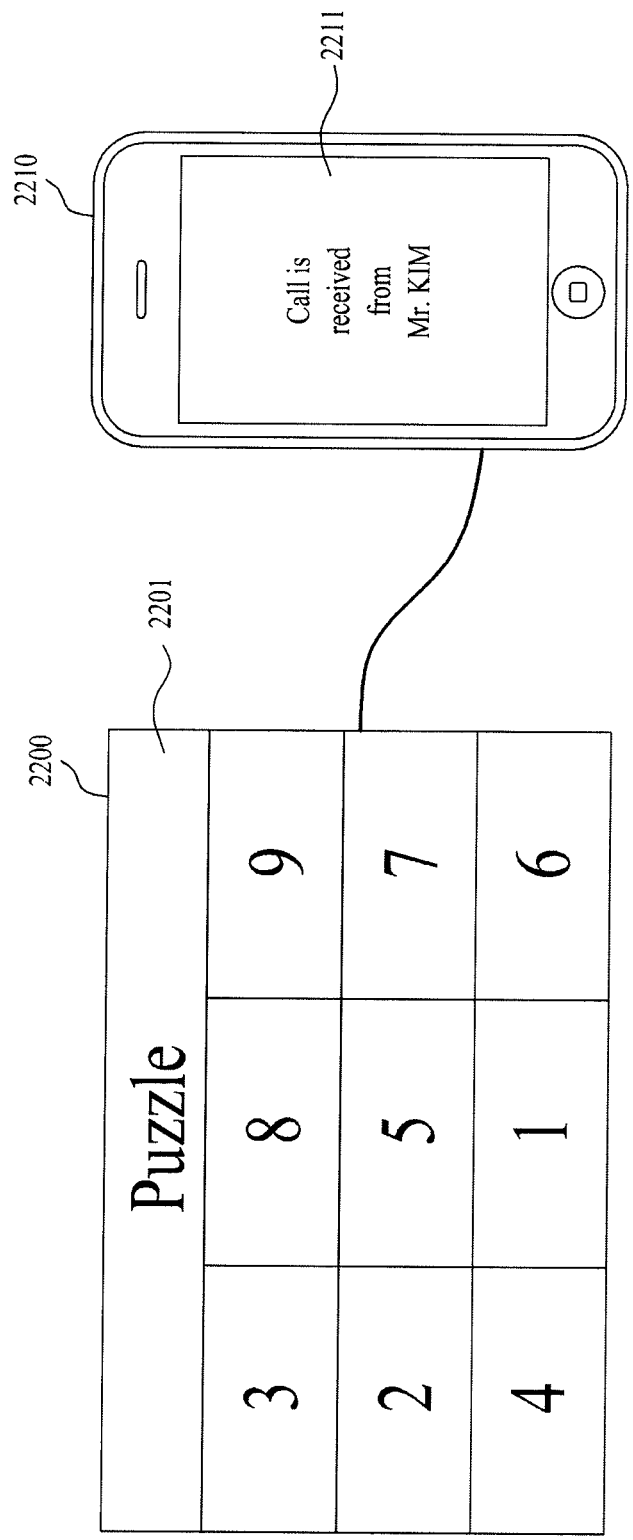

Finally, although the server and the client output the same screen in FIG. 21, the server and the client may provide different screens as shown in FIG. 22, without departing from the scope of the present invention.

For example, as shown in FIG. 22, if a specific object stored in the server 2210 is executed, the screen on which the specific object is executed is first displayed on the server 2210 and the client 2200. However, when a phone call is received from an external device of the server 2210, a message is displayed on the screen 2211 of the server 2210 and the client 2200 still displays the screen 2201 on which the specific object is executed.

According to the above-described embodiments, it is possible to provide the same file hierarchy and user interface to the client and the server of the mirroring technique in a media streaming and file transferring process between heterogeneous devices. Further, in order to implement the above-described embodiments, a data hierarchy and process necessary for UPnP is additionally defined to maximize the effect of the screen mirroring technique.

More specifically, for example, an embodiment of correcting the state variable of a UPnP ContentDirectory service or an embodiment of separately defining a new UPnP service is possible. The above-described embodiments are within the scope of the present invention. Two embodiments may be combined by those skilled in the art as needed and the scope of the present invention is not limited by the names shown in the figures.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device for performing data communication with a mobile device, the display device comprising:
   a transmitter/receiver configured to establish a mirroring connection with the mobile device, wherein the display device displays a current screen of the mobile device based on the mirroring connection;
   a user interface configured to receive a command by a sensing unit for selecting a first location value based on an input to the sensing unit, the first location value being selected through the user interface of the display device; and
   a controller configured to transmit at least one command via the transmitter/receiver to control a specific object corresponding to the first location value to the mobile device,
   wherein the at least one command includes first information for requesting a content format supported by the mobile device, second information for providing the mobile device with a content format that can be used for connection between the mobile device and the display device, and third information for requesting metadata of the specific object, and
   wherein the controller controls the display device to output at least one of video data and audio data associated with execution of the specific object.

2. The display device according to claim 1, wherein the at least one command further includes:
   third information to request metadata of the specific object, and
   fourth information to control the execution of the specific object.

3. The display device according to claim 2, wherein, if the second information is null, the display device does not process the specific object.

4. The display device according to claim 1, wherein:
   after the mirroring connection is established, a virtual network computing (VNC) stream is set up for communication, and
   after the specific object is selected using VNC, a real-time transport protocol (RTP) or hypertext transfer protocol (HTTP) stream is set up for communication.

5. The display device according to claim 4, wherein:
   the mobile device and the display device are physically connected through a universal serial bus (USB), and
   the display device is mounted in a car.

6. A mobile device for performing data communication with a display device, the mobile device comprising:
   a display configured to display a current screen including at least one object;
   a transmitter configured to transmit an image corresponding to the current screen to the display device when a mirroring connection with the display device is established;
   a receiver configured to receive at least one command through a user interface module being associated with the transmitted image to control a specific object from the display device,
   wherein the at least one command includes first information for requesting a content format supported by the mobile device, second information for providing the mobile device with a content format that can be used for connection between the mobile device and the display device, and third information for requesting metadata of the specific object; and
   a controller configured to execute the specific object based on the received at least one command.

7. The mobile device according to claim 6, wherein the controller controls the specific object based on the at least one command received through the user interface module of the display device using a coordinate value received from the display device.

8. The mobile device according to claim 6, wherein the at least one command further includes:
   third information to request metadata of the specific object, and
   fourth information to control the execution of the specific object.

9. The mobile device according to claim 8, wherein, if the second information is null, the display device does not process the specific object.

10. The mobile device according to claim 6, wherein:
   after the mirroring connection is established, a virtual network computing (VNC) stream is set up for communication, and
   after the specific object is selected using VNC, a real-time transport protocol (RTP) or a hypertext transfer protocol (HTTP) stream is set up for communication.

11. A method for controlling a display device for performing data communication with a mobile device, the method comprising:
   establishing, via a transmitter/receiver, a mirroring connection with the mobile device;
   displaying, on the display device, a current screen of the mobile device;
   receiving a command for selecting a first location value associated with the displayed screen through a user interface of the display device, the first location value being selected via the user interface;
   in response to the command, transmitting a signal for requesting metadata corresponding to the first location value to the mobile device, wherein the signal includes first information for requesting a content format supported by the mobile device, second information for providing the mobile device with a content format that can be used for connection between the mobile device and the display device, and third information for requesting metadata corresponding to the first location value;
   receiving a signal including metadata of a specific object from the mobile device, in response to the transmitted signal; and
   outputting at least one of video data and audio data associated with execution of the specific object.

12. The method according to claim 11, wherein the received signal includes at least one piece of protocol identification information supported by the mobile device.

13. The method according to claim 12, wherein the received signal is added as a state variable (statevariable) of a content directory service defined in universal plug and play (UPnP).

14. The method according to claim 11, wherein the specific object defines data returned by a content directory service from a browsing action or a searching action.

15. The method according to claim 11, wherein the transmitting the signal includes transmitting a signal for requesting the metadata and a coordinate value of the first location value.

16. A method for controlling a mobile device for performing data communication with a display device, the method comprising:
   outputting, via a display, a current screen including at least one object;
   transmitting, by the mobile device, an image corresponding to the current screen to the display device when a mirroring connection with the display device is established;
   transmitting a signal including metadata of a specific object to the display device, in response to a request signal from the display device, wherein the signal includes first information for requesting a content format supported by the mobile device, second information for providing the mobile device with a content format that can be used for connection between the mobile device and the display device, and third information for requesting metadata of the specific object; and
   executing, by the mobile device, the specific object.

17. The method according to claim 16, further comprising controlling the specific object based on at least one command received through a user interface module of the display device using a coordinate value received from the display device.

18. The method according to claim 16, wherein the transmitted signal includes at least one piece of protocol identification information supported by the mobile device.

19. The method according to claim 18, wherein the transmitted signal is added as a state variable (statevariable) of a content directory service defined in universal plug and play (UPnP).

20. The method according to claim 16, wherein the specific object defines data returned by a content directory service from a browsing action or a searching action.

* * * * *